(12) United States Patent
Muramatsu et al.

(10) Patent No.: US 12,236,302 B2
(45) Date of Patent: Feb. 25, 2025

(54) AIRCRAFT TIRE

(71) Applicant: BRIDGESTONE CORPORATION, Tokyo (JP)

(72) Inventors: Tomoyuki Muramatsu, Tokyo (JP); Toshihiko Iwasaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 177 days.

(21) Appl. No.: 17/800,259

(22) PCT Filed: Feb. 16, 2021

(86) PCT No.: PCT/JP2021/005712
§ 371 (c)(1),
(2) Date: Aug. 17, 2022

(87) PCT Pub. No.: WO2021/166909
PCT Pub. Date: Aug. 26, 2021

(65) Prior Publication Data
US 2023/0078891 A1  Mar. 16, 2023

(30) Foreign Application Priority Data
Feb. 18, 2020 (JP) .................................. 2020-025382

(51) Int. Cl.
*G06K 19/077* (2006.01)
*B60C 9/20* (2006.01)
*B60C 19/00* (2006.01)

(52) U.S. Cl.
CPC .......... *G06K 19/07764* (2013.01); *B60C 9/20* (2013.01); *B60C 19/00* (2013.01); *B60C 2019/004* (2013.01)

(58) Field of Classification Search
CPC ....... G06K 19/07775; G06K 19/07758; G06K 19/07786; G06K 19/07771;
(Continued)

(56) References Cited

U.S. PATENT DOCUMENTS 5,432,518 A * 7/1995 van Erven .......... B60C 23/0493
340/505
7,106,173 B2 * 9/2006 Scott .................. G06K 19/0723
340/572.1
(Continued)

FOREIGN PATENT DOCUMENTS

EP  1 688 276 A2  8/2006
EP  2 039 536 A1  3/2009
(Continued)

OTHER PUBLICATIONS

Extended European Search Report dated Jul. 3, 2023 in Application No. 21756892.2.
(Continued)

*Primary Examiner* — Curtis J King
(74) *Attorney, Agent, or Firm* — Sughrue Mion, PLLC (57) ABSTRACT

An aircraft tire has a pair of bead sections, sidewall sections extending from the bead sections, and a tread section extending between the sidewall sections; the aircraft tire includes an RFID tag having a tag main body (IC chip) configured to store information about the aircraft tire, and an antenna extended from the tag main body, wherein, in a tread surface view, the antenna is disposed such that an extending direction of the antenna is parallel to a tire width direction or intersects the tire width direction within a predetermined angle range, and the aircraft tire satisfies a configuration 0.1<L/W<0.2, where a width of the aircraft tire is denoted as "W" and a total length of the antenna in the extending direction of the antenna is denoted as "L", and when a diameter of the aircraft tire is 21 inches or more.

4 Claims, 5 Drawing Sheets

| | | COMMUNICATION DISTANCE (cm) | ANTENNA WIDTH (mm) | TIRE WIDTH (mm) | L/W |
|---|---|---|---|---|---|
| 21 INCHES | RADIAL | 96 | 60 | 372 | 0.16129 |
| | | 270 | 50 | 372 | 0.134409 |
| | BIAS | 88 | 60 | 414 | 0.144928 |
| | | 116 | 50 | 414 | 0.120773 |
| 15 INCHES | | 38 | 60 | 193 | 0.310881 |
| | | 32 | 50 | 193 | 0.259067 |

(58) Field of Classification Search
CPC ...... G06K 19/07794; H01Q 1/38; H01Q 7/00; H01Q 1/2225; H01Q 9/24
See application file for complete search history.

(56) References Cited

U.S. PATENT DOCUMENTS

| | | | | |
|---|---|---|---|---|
| 7,439,928 B2* | 10/2008 | Forster | G06K 19/07758 | 343/895 |
| 7,515,052 B2* | 4/2009 | Dixon | G06K 19/07749 | 340/572.1 |
| 7,516,901 B2* | 4/2009 | Yamagajo | G06K 19/07372 | 235/492 |
| 7,893,813 B2* | 2/2011 | Nikitin | G06K 19/0723 | 235/491 |
| 7,971,336 B2* | 7/2011 | Hanhikorpi | G06K 19/0775 | 29/601 |
| 8,371,509 B2* | 2/2013 | Bohn | G06K 19/07756 | 235/488 |
| 8,493,183 B2* | 7/2013 | Yamagajp | H01Q 1/38 | 343/866 |
| 8,582,307 B2* | 11/2013 | Yu | H01Q 1/22 | 361/736 |
| 8,624,740 B2* | 1/2014 | Sweeney | G06K 19/07345 | 235/451 |
| 8,797,148 B2* | 8/2014 | Kato | H01Q 1/2208 | 340/572.1 |
| 8,830,066 B2* | 9/2014 | Chen | H01Q 1/2225 | 340/572.1 |
| 8,878,652 B2* | 11/2014 | Tsirline | H01Q 1/2225 | 340/10.2 |
| 8,928,472 B2* | 1/2015 | Borot | G06K 19/07764 | 340/426.33 |
| 8,973,832 B2* | 3/2015 | Matsumura | G06K 19/07749 | 340/572.1 |
| 11,021,021 B1* | 6/2021 | Nicula | B60C 19/00 | |
| 2003/0080919 A1* | 5/2003 | Forster | H01Q 1/38 | 343/895 |
| 2003/0132893 A1* | 7/2003 | Forster | G06K 19/07749 | 343/793 |
| 2003/0179086 A1* | 9/2003 | Nantz | H01Q 1/3233 | 340/445 |
| 2004/0020040 A1* | 2/2004 | Arneson | G06K 19/07718 | 156/60 |
| 2004/0032377 A1* | 2/2004 | Forster | B60C 23/04 | 343/793 |
| 2004/0036572 A1* | 2/2004 | Forster | G06K 19/07749 | 340/5.61 |
| 2005/0076992 A1 | 4/2005 | Metcalf et al. | | |
| 2005/0274448 A1* | 12/2005 | Lettieri | B24B 5/366 | 134/1 |
| 2006/0097870 A1* | 5/2006 | Choi | H01Q 1/36 | 340/572.1 |
| 2006/0158380 A1* | 7/2006 | Son | H01Q 1/2225 | 343/866 |
| 2006/0214801 A1* | 9/2006 | Murofushi | H01Q 1/22 | 340/572.7 |
| 2006/0244606 A1* | 11/2006 | Li | H01Q 9/28 | 340/572.7 |
| 2006/0289525 A1* | 12/2006 | Hovorka | H05B 6/763 | 219/737 |
| 2007/0046475 A1* | 3/2007 | Carrender | G08B 13/24 | 340/572.7 |
| 2007/0126586 A1* | 6/2007 | Ohtaka | G06K 19/07749 | 343/750 |
| 2007/0216591 A1* | 9/2007 | Tsirline | G06K 7/10316 | 340/10.2 |
| 2008/0143535 A1* | 6/2008 | Fischer | H01Q 1/2225 | 340/572.7 |
| 2009/0079574 A1* | 3/2009 | Oroku | G06K 19/07749 | 340/572.7 |
| 2009/0278690 A1* | 11/2009 | Degani | G06K 19/07749 | 340/572.1 |
| 2010/0060457 A1* | 3/2010 | Burnside | H01Q 21/005 | 343/810 |
| 2010/0134291 A1* | 6/2010 | Lavedas | H01Q 1/2225 | 340/572.7 |
| 2010/0308965 A1* | 12/2010 | Weitzhandler | G06K 19/07771 | 235/493 |
| 2011/0000969 A1* | 1/2011 | Tucker | G06K 19/041 | 438/126 |
| 2011/0032174 A1* | 2/2011 | Sinnett | H01Q 1/2241 | 29/601 |
| 2011/0198402 A1* | 8/2011 | Tucker | G06K 19/07749 | 235/492 |
| 2011/0226401 A1 | 9/2011 | Battocchio et al. | | |
| 2011/0259497 A1* | 10/2011 | Borot | B60C 19/00 | 524/588 |
| 2012/0039560 A1* | 2/2012 | Mazur | G02F 3/024 | 385/2 |
| 2012/0182147 A1* | 7/2012 | Forster | H01Q 1/2225 | 340/572.7 |
| 2014/0368327 A1* | 12/2014 | Darrer | G06K 19/0708 | 340/447 |
| 2015/0191055 A1* | 7/2015 | Schumacher | B60C 23/0408 | 340/447 |
| 2015/0314542 A1* | 11/2015 | Tucker | B60C 5/00 | 29/601 |
| 2015/0356396 A1* | 12/2015 | Yuan | H01Q 1/2225 | 228/248.1 |
| 2016/0031272 A1* | 2/2016 | Peine | B60C 11/243 | 340/442 |
| 2016/0075189 A1* | 3/2016 | Engel | G06K 7/10366 | 340/438 |
| 2016/0132705 A1* | 5/2016 | Kovarik | G06K 7/10376 | 340/10.3 |
| 2016/0133067 A1* | 5/2016 | Sinner | G07C 5/0808 | 340/459 |
| 2016/0375733 A1* | 12/2016 | Lesesky | B60C 23/0494 | 340/442 |
| 2017/0308782 A1* | 10/2017 | Burkholder | G06K 19/0726 | |
| 2017/0358839 A1* | 12/2017 | Wu | H01Q 1/2225 | |
| 2019/0244074 A1* | 8/2019 | Borgna | G06K 19/07764 | |
| 2019/0341673 A1* | 11/2019 | Destraves | H01Q 1/2241 | |
| 2020/0164605 A1* | 5/2020 | Yoshida | H01Q 1/2225 | |
| 2020/0342280 A1* | 10/2020 | Mei | G06K 19/07701 | |
| 2021/0053306 A1* | 2/2021 | Cassidy | B60C 99/00 | |
| 2021/0129596 A1* | 5/2021 | Francois | B64C 25/36 | |
| 2021/0271951 A1* | 9/2021 | Moon | C09J 133/08 | |
| 2022/0016934 A1* | 1/2022 | Barbarin | B60C 9/2006 | |
| 2022/0126634 A1* | 4/2022 | Suita | B60C 15/0628 | |
| 2022/0134814 A1* | 5/2022 | Iozia | G06K 19/0779 | 73/146.5 |
| 2022/0161513 A1* | 5/2022 | Ogimoto | B29D 30/0061 | |
| 2022/0339976 A1* | 10/2022 | Destraves | B60C 15/0607 | |
| 2023/0001749 A1* | 1/2023 | De Witte | B60C 23/061 | |
| 2023/0014878 A1* | 1/2023 | Destraves | H01Q 1/2241 | |
| 2023/0144232 A1* | 5/2023 | Caccami | H01Q 1/2241 | 73/146.5 |
| 2023/0196055 A1* | 6/2023 | Dong | B60C 19/00 | 340/447 |
| 2023/0415520 A1* | 12/2023 | Yoshino | G06K 19/07764 | |
| 2024/0001721 A1* | 1/2024 | Chico | B60C 23/0471 | |

FOREIGN PATENT DOCUMENTS

| | | |
|---|---|---|
| JP | 2010-269670 A | 12/2010 |
| JP | 2010-285023 A | 12/2010 |
| JP | 2011-178388 A | 9/2011 |
| JP | 2017-013521 A | 1/2017 |
| JP | 2017-132291 A | 8/2017 |
| WO | 2004/074016 A1 | 9/2004 |

OTHER PUBLICATIONS

International Search Report for PCT/JP2021/005712 dated Apr. 6, 2021.

* cited by examiner

| | | COMMUNICATION DISTANCE (cm) | ANTENNA WIDTH (mm) | TIRE WIDTH (mm) | L/W |
|---|---|---|---|---|---|
| 21 INCHES | RADIAL | 96 | 60 | 372 | 0.16129 |
| | | 270 | 50 | 372 | 0.134409 |
| | BIAS | 98 | 60 | 414 | 0.144928 |
| | | 116 | 50 | 414 | 0.120773 |
| 15 INCHES | | 38 | 60 | 193 | 0.310881 |
| | | 32 | 50 | 193 | 0.259067 |

FIG. 9

AIRCRAFT TIRE

CROSS REFERENCE TO RELATED APPLICATIONS

This application is a National Stage of International Application No. PCT/JP2021/005712 filed Feb. 16, 2021, claiming priority based on Japanese Patent Application No. 2020-025382 filed Feb. 18, 2020.

TECHNICAL FIELD

The present invention relates to an aircraft tire mainly used for an airliner or the like.

RELATED ART

Contactless RFID (Radio Frequency Identification) tags configured to write and read information using electromagnetic waves are widely used.

An aircraft tire is managed by attaching the RFID tag to the aircraft tire, and writing and reading information related to the tire.

For example, Patent Literature 1 discloses a structure of an aircraft tire in which the RFID tag is embedded in a crown region thereof and a dipole antenna is disposed in an axial direction.

CITATION LIST

Patent Literature

Patent Literature 1: U.S. Patent Application Publication No. 2011/0226401

SUMMARY OF INVENTION

However, when a size (diameter) of the tire is large, for example, 21 inches or more, the above-described conventional aircraft tire may have a problem that a communication performance deteriorates due to attenuation of electromagnetic waves or the like caused by a large tire width.

An object of the present invention is to provide an aircraft tire that improves RIFD tag communication performance even when a size is 21 inches or larger.

One or more embodiments of an aircraft tire (T) according to present invention has a pair of bead sections (100), sidewall sections (104) extending from outer side in a radial direction of the bead section, and a tread section (106) extending between the sidewall sections; the aircraft tire includes an RFID tag (10) having a tag main body (11) configured to store information about the aircraft tire, and an antenna (A1, A2) extended from the tag main body; wherein, in a tread surface view, the antenna is disposed such that an extending direction (D1) of the antenna is parallel to a tire width direction or intersects the tire width direction (D2) within a predetermined angle range, and the aircraft tire satisfies a relationship $0.1 < L/W < 0.2$, where a width of the aircraft tire is denoted as "W" and a total length of the antenna in the extending direction of the antenna is denoted as "L", and when a diameter of the aircraft tire is 21 inches or more.

According to such a configuration, the communication performance of the RFID tag can be improved by satisfying the above relationship to reduce attenuation of electromagnetic waves or the like, even when the size thereof is 21 inches or more.

BRIEF DESCRIPTION OF DRAWINGS

FIG. 5(*a*) is a schematic configuration diagram illustrating other configuration examples of RFID tags to be applied to the aircraft tire according to some embodiments.

FIG. 5(*b*) is a schematic configuration diagram illustrating other configuration examples of RFID tags to be applied to the aircraft tire according to some embodiments.

DESCRIPTION OF EMBODIMENTS

An aircraft tire T according to an embodiment of one or more embodiments will be described with reference to FIGS. 1 to 9.

In the following drawings, the same or similar parts are denoted by the same or similar numerals. However, it should be noted that the drawings are schematic, and the ratio of each dimension and the like may be different from the actual figures.

Therefore, specific dimensions should be determined in consideration of the following description. Further, it is needless to say that portions having different dimensional relationships and ratios among the drawings are included.

Configuration Example of Aircraft Tire T

An example of a configuration of an aircraft tire T will be described with reference to FIGS. 1 and 2.

Figure 1:
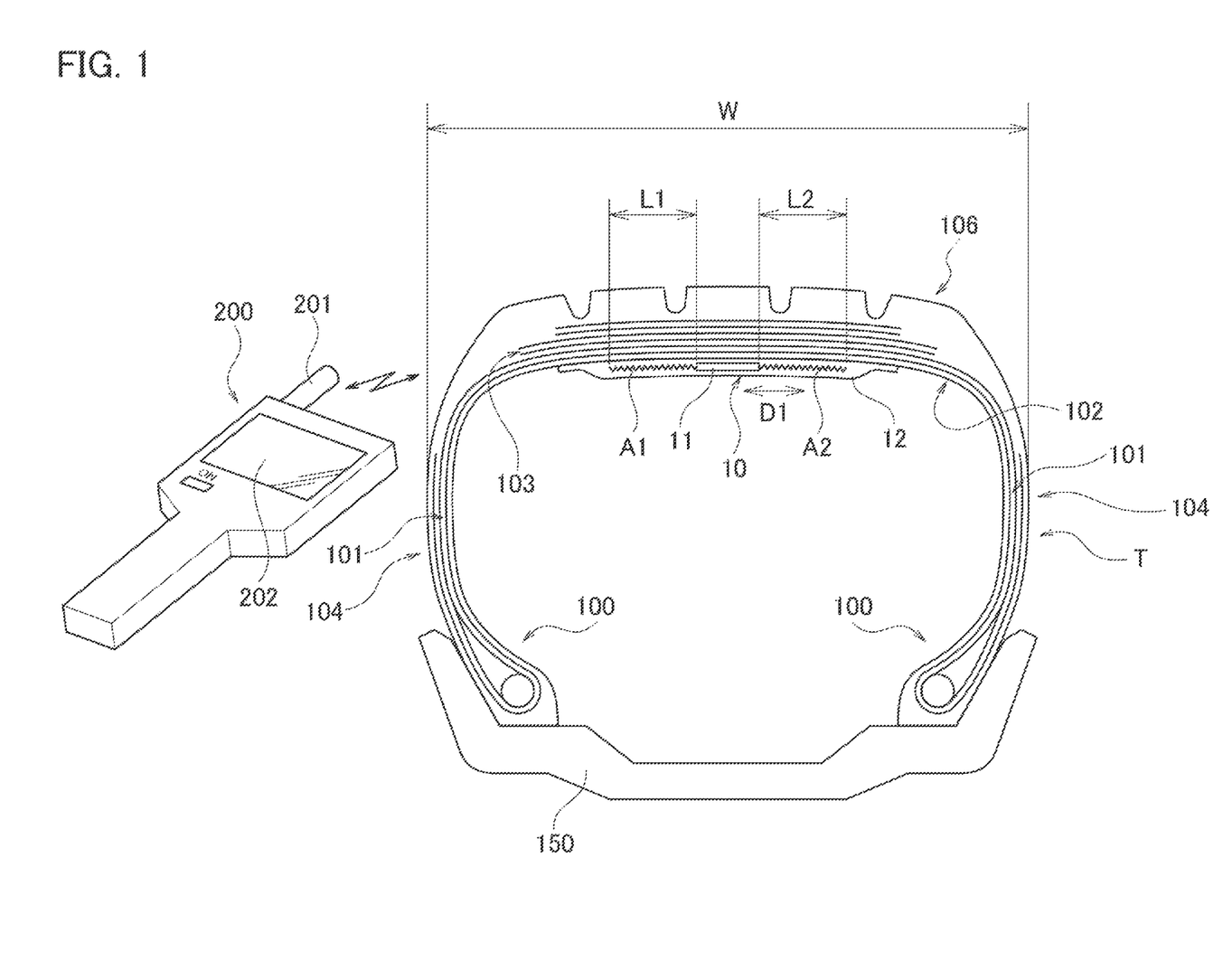
FIG. 1 is a cross-sectional view in a tread width direction illustrating a schematic configuration of an aircraft tire according to one or more embodiments.
Figure 2:
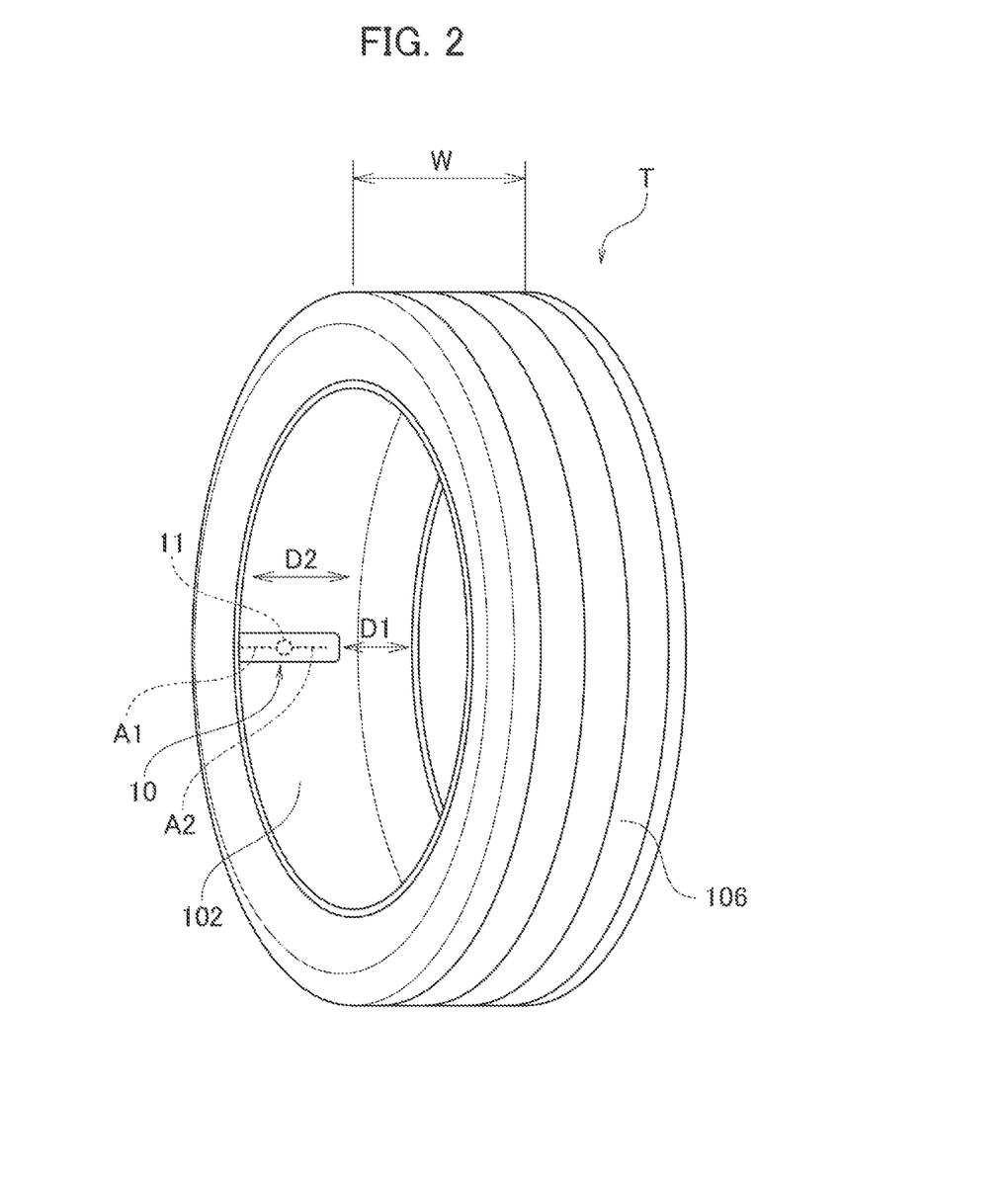
FIG. 2 is a perspective view illustrating a schematic configuration of the aircraft tire according to the one or more embodiments.

FIG. 1 is a cross-sectional view in a tread width direction illustrating a schematic configuration of the aircraft tire T according to one or more embodiments; and FIG. 2 is a perspective view illustrating a schematic configuration of the aircraft tire T.

The aircraft tire T includes a bead section 100 to be in contact with a wheel 150, a carcass 101 as a frame of the aircraft tire T, a plurality of belt parts 103 disposed on an outer side in a tire radial direction of the carcass 101, and a tread section 106 disposed on an outer side in the tire radial direction of the belt part 103 and configured to be in contact with a road surface. A sidewall section 104 extending from an outer side in a radial direction of a pair of the bead sections 100.

As illustrated in FIG. 1, a tire inner surface 102 of the aircraft tire T according to the present embodiment is provided with an RFID tag 10 including an IC chip 11 as a tag main body configured to store information (information such as serial number, size, and proper internal pressure) about the aircraft tire T and antennas A1 and A2 extended from the IC chip 11.

More specifically, the RFID tag 10 is formed by sealing the IC chip 11 and the antennas A1 and A2 within a rubber patch 12, and is attached to the tire inner surface 102 by an adhesive.

As illustrated in FIG. 2, the antennas A1 and A2 are disposed such that their extending direction D1 is parallel to a tire width direction D2 or intersects the tire width direction D2 within a predetermined angle range (For example, within 5 degrees) in a tread surface view.

Further, the aircraft tire satisfies a relationship $0.1<L/W<0.2$, where a width of the aircraft tire is denoted as "W" and a total length (L1, L2) of the antennas in the extending direction D1 is "L", and when a diameter of the aircraft tire T is 21 inches or more.

A RFID reader/writer 200 illustrated in FIG. 1 is configured to transmit and receive information to and from the RFID tag 10.

The RFID reader/writer 200 includes a communication antenna 201 and an information display part 202 having a liquid crystal display, etc.; and the RFID reader/writer 200 is configured to display and review information (information such as serial number, size, and proper internal pressure) about the aircraft tire T read from the RFID tag 10.

With such a configuration, when the diameter of the aircraft tire T is 21 inches or more, the attenuation of electromagnetic waves in the aircraft tire T reduces and improves the communication performance of the RFID tag. Measurement examples for reviewing the communication performance of the aircraft tire T will be described later.

When a balance patch is provided on the tire inner surface 102, the RFID tag 10 is disposed circumferentially apart from the balance patch. Thus, the RFID tag 10 can be provided in the aircraft tire T while maintaining the balance of the aircraft tire T.

The belt part 103 disposed in the tread section 106 may be made of a non-metal material. With such a configuration, the attenuation of electromagnetic waves between the RFID tag 10 and the RFID reader/writer 200 or the like may reduce, thereby may improve the communication performance.

Further, by attaching the RFID tag 10 to the tire inner surface 102, the bead section 100 can function as an antenna, and the communication performance is further improved. Moreover, the sensitivity of the RFID tag 10 is enhanced by the reflection of the electromagnetic wave at the bead section 100.

Configuration Example of RFID Tag

Figure 3:
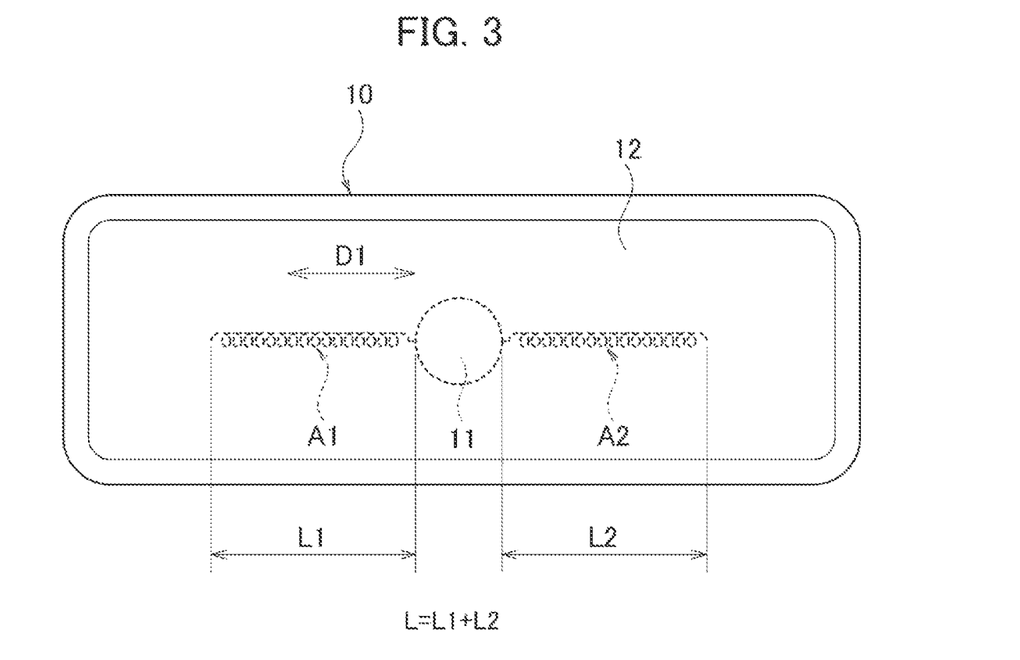
FIG. 3 is a schematic configuration diagram illustrating a configuration example of an RFID tag to be applied to the aircraft tire according to the one or more embodiments.
Figure 4:
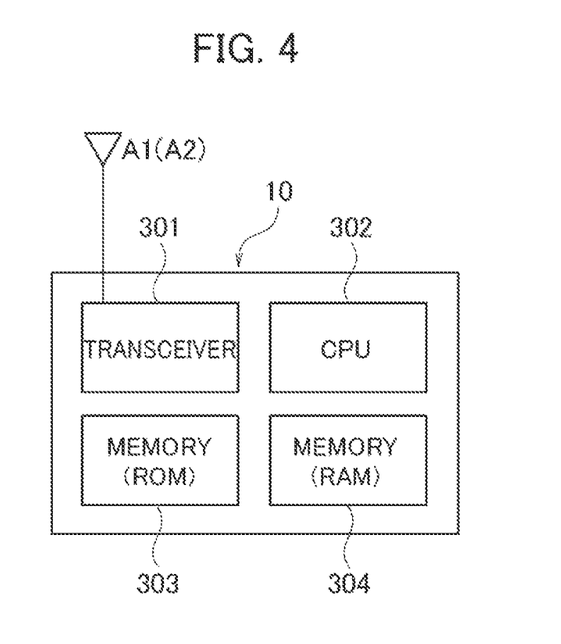
FIG. 4 is a block diagram illustrating an internal configuration of the RFID tag to be applied to the aircraft tire according to the one or more embodiments.

Referring to FIGS. 3 and 4, a configuration example of the RFID tag 10 applicable to the aircraft tire T according to the present embodiment will be described.

FIG. 3 is a schematic configuration diagram illustrating a configuration example of an RFID tag 10 to be applied to the aircraft tire T according to the present embodiment; and FIG. 4 is a block diagram illustrating an internal configuration of the RFID tag 10.

As illustrated in FIG. 3, the RFID tag 10 is formed by sealing the IC chip 11 and the antennas A1 and A2 within the rubber patch 12. An adhesive layer is provided on a back surface of the rubber patch 12 so as to be attached to the tire inner surface 102.

As illustrated in FIG. 4, the RFID tag 10 includes the antennas A1, A2, a transmitter/receiver (transceiver) 301 including an RF circuit and a power supply circuit, a CPU 302 as a controller, a memory 303 including a nonvolatile memory ROM, and a memory 304 including a volatile memory (RAM).

The antennas A1 and A2 communicate with the RFID reader/writer 200 and the like. The antennas A1 and A2 also serve as power receiving devices configured to feed electrical power to the transmitter/receiver 301 or the like depending on radio signals from the RFID reader/writer 200 or the like.

The transmitter/receiver 301 modulates/demodulates data transmitted/received by the RF circuit, and feeds electrical power to the CPU 302 or the like by the power supply circuit.

In accordance with the command received from the antennas A1 and A2, the CPU 302 performs processing such as responding to data (Serial number, size, proper internal pressure, etc.) about the aircraft tire T or a unique 1D recorded in the memory 303.

The memory 304 is used as a work area of the CPU 302.

Antenna Configuration Example

Figure 5:
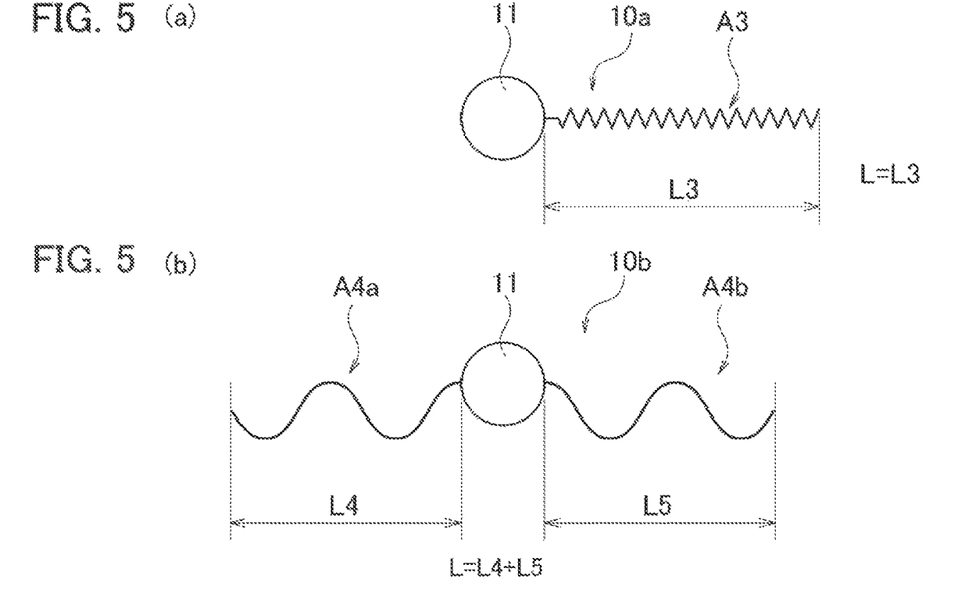

Referring to FIGS. 3 and 5, a configuration example of the antenna in the RFID tag 10 will be described.

Antennas A1 and A2 illustrated in FIG. 3 are formed to be a so-called dipole antenna in which antenna lines having linear shape and same length (L1, L2) extends from right and left ends of the IC chip 11. The antenna wire may be formed of a coil winding.

In the antennas A1 and A2 illustrated in FIG. 3, the parameter L (the total length of the antenna in the extending direction of the antenna) under the relationship of $0.1<L/W<0.2$ is expressed by L=L1+L2.

The antenna A3 illustrated in FIG. 5(a) is a so-called monopole antenna in which an antenna line having a linear shape and having a length L3 extends from a right end of the IC chip 11. The antenna wire may be formed of a coil winding.

In the antenna A3 of a RFID tag 10a illustrated in FIG. 5(a), the parameter L in the relationship of $0.1<L/W<0.2$ is expressed by L=L3.

The antennas A4a and A4b of the RFID tag 10b illustrated in FIG. 5(b) are formed to be a so-called dipole antenna in which antenna lines having wavy-line shape extends from left and right ends of the IC chip 11.

The distances L4 and L5 from the end of the IC chip 11 to the ends of the antennas A4a and A4b are made the same.

In the antennas A4a and A4b illustrated in FIG. 5(b), the parameter L under the relationship of $0.1<L/W<0.2$ is expressed by L=L4+L5.

Measurement Examples of Communication Distance

Measurement examples of communication distance of the RFID tags 10 will be described with reference to FIGS. 6 and 7.

Figure 6:
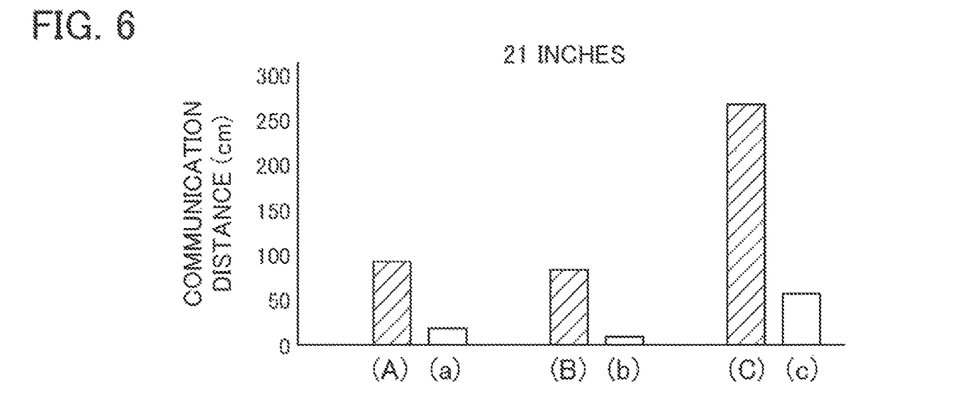
FIG. 6 is a graph depicting communication distances of experimental RFID tags (A) to (C) or the like for the aircraft tire (21 inches) according to the embodiments.
Figure 7:
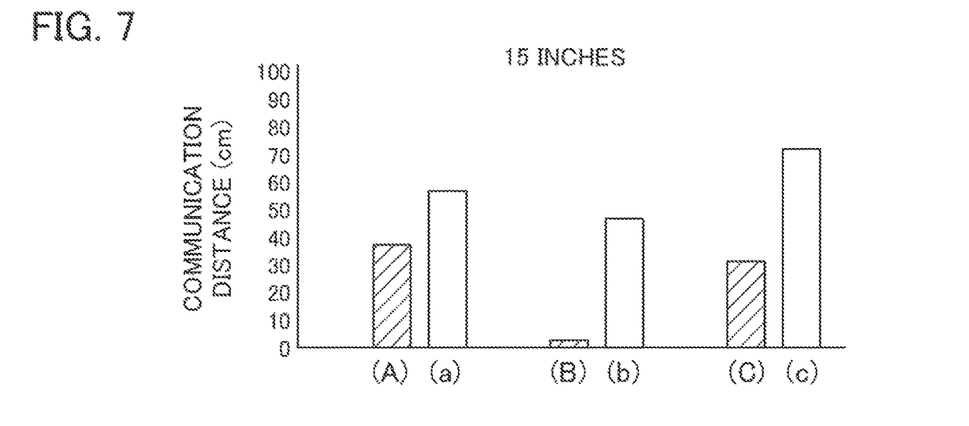
FIG. 7 is a graph depicting communication distances of experimental RFID tags (A) to (C) or the like for an aircraft tire (15 inches) according to comparative examples.

FIG. 6 is a graph depicting communication distances of experimental RFID tags (A) to (C) or the like for an aircraft tire (21 inches) according to the present embodiment; and FIG. 7 is a graph depicting communication distances of experimental RFID tags (A) to (C) or the like for an aircraft tire (15 inches) according to a comparative example.

For measurements, three experimental RFID tags (A) to (C) with different lengths of the antennas (antenna width) A1 and A2 are prepared as the RFID tag 10 having a dipole antenna illustrated in FIG. 3.

Here, a length of antennas (antenna width) of the experimental RFID tag (A) is 60 mm, a length of the antenna (antenna width) of the experimental RFID tag (B) is 70 mm, and a length of antenna (antenna width) of the experimental RFID tag (C) is 50 mm.

An aircraft tire (15 inches) as a comparative example and the aircraft tire (21 inches) are prepared, and the experimental RFID tags (A) to (C) are attached to the tire inner surface 102 as illustrated in FIG. 2 such that the extending direction D1 of the antennas A1 and A2 are parallel to the tire width direction D2 or intersect the tire width direction D2 within a predetermined angle range (For example, within 5 degrees), and the communication distance readable by the RFID reader/writer 200 are measured.

With the aircraft tire (21 inches), the communication distance of the experimental RFID tag (A) as approximately 96 cm, the communication distance of the experimental RFID tag (B) is approximately 87 cm, and the communication distance of the experimental RFID tag (C) is approximately 270 cm.

By contrast, with the aircraft tire (15 inches), the communication distance of the experimental RFID tag (A) is approximately 38 cm, the communication distance of the experimental RFID tag (B) is approximately 3 cm, and the communication distance of the experimental RFID tag (C) is approximately 32 cm.

Note that items (a) to (c) in FIGS. 6 and 7 depict communication distances that are measured in the aircraft tire when the experimental RFID tags (A) to (C) are provided along a circumferential direction of the aircraft tire as a reference.

According to these graphs, in the case of the aircraft tire (21 inches), the communication distance tends to be longer when the experimental RFID tags (A) to (C) are provided along the width direction than when the experimental RFID tags (A) to (C) are provided along the circumferential direction.

By contrast, in the case of the aircraft tire (15 inches), the communication distance tends to be longer when the experimental RFID tags (A) to (C) are provided along the circumferential direction than when the experimental RFID tags (A) to (C) are provided along the width direction.

As described above, when the experimental RFID tags (A) to (C) are attached to the tire inner surface 102 such that the extending direction D1 of the antennas A1 and A2 are parallel to the tire width direction D2 or intersect the tire width direction D2 within a predetermined angle range (For example, within 5 degrees), the aircraft tire (21 inches) having relatively large diameter has a longer communication distance than the aircraft tire (15 inches) having relatively small diameter.

Relationship Between Communication Distance and L/W

Figure 8:
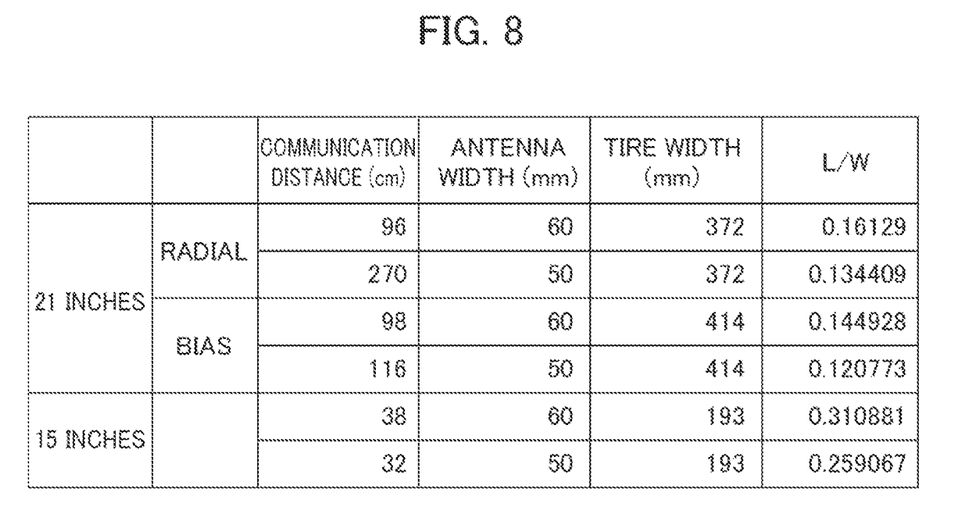
FIG. 8 is a table comparing a value L (antenna width)/W (tire width) of the aircraft tire (21 inches) according to the present embodiment and the value L/W of the aircraft tire (15 inches) according to the comparative examples.
Figure 9:
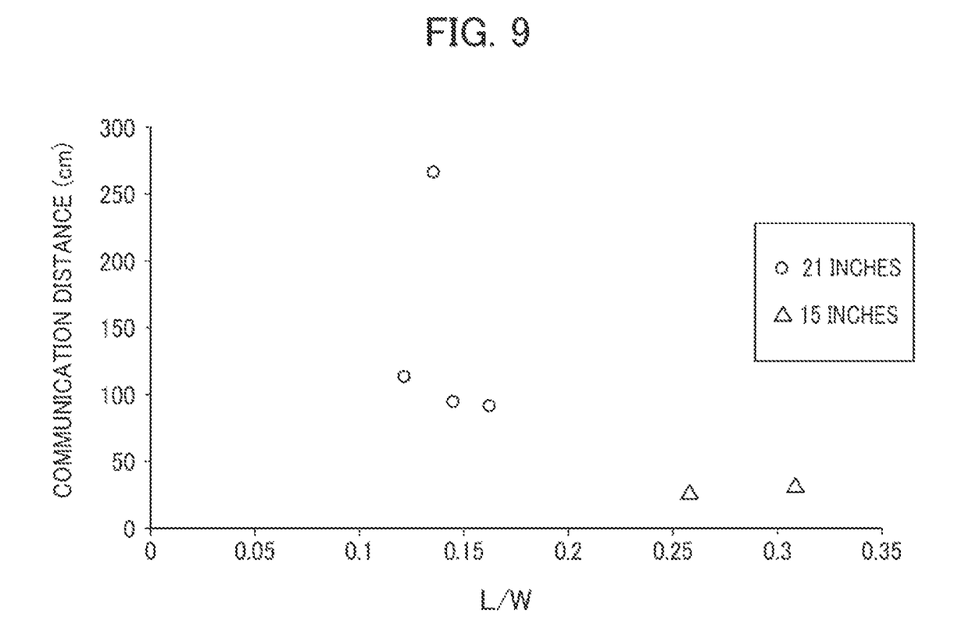
FIG. 9 is a graph depicting a relationship between the value L (antenna width)/W (tire width) and the communication distance in the aircraft tire (21 inches) according to the present embodiment and the aircraft tire (15 inches) according to the comparative examples.

Referring to FIGS. 8 and 9, a relationship between the communication distance and "L/W" will be described with respect to the aircraft tire T (21 inches) provided with the RFID tag 10 and the aircraft tire for a comparative example (15 inches).

FIG. 8 is a table comparing a value L (antenna width)/W (tire width) of the aircraft tire T (21 inches) according to the present embodiment and the value L (antenna width)/W (tire width) of the aircraft tire (15 inches) according to the comparative example; and FIG. 9 is a graph depicting a relationship between the value L (antenna width)/W (tire width) and the communication distance in the aircraft tire T (21 inches) and the value L (antenna width)/W (tire width) and the communication distance in the aircraft tire (15 inches) according to the comparative example.

As described in FIG. 8, for the aircraft tire with a diameter 21 inches (radial) and a tire width 372 mm equipped with an antenna with an antenna width of 60 mm, the value L/W with an antenna width of 60 mm is 0.16129 and the communication distance is 96 cm.

For the aircraft tire with a diameter 21 inches (radial) and a tire width 372 mm equipped with an antenna with an antenna width of 50 mm the value L/W is 0.134409 and the communication distance is 270 cm.

For the aircraft tire with a diameter 21 inches (bias) and a tire width 414 mm equipped with an antenna with an antenna width of 60 mm the value L/W is 0.144928 and the communication distance is 98 cm.

For the aircraft tire with a diameter 21 inches (bias) and a tire width 414 mm equipped with an antenna with an antenna width of 50 mm the value L/W is 0.120773 and the communication distance is 116 cm.

By contrast, for the aircraft tire with a diameter 15 inches and a tire width 193 mm equipped with an antenna with an antenna width of 60 mm, the value L/W is 0.310881 and the communication distance is 38 cm.

For the aircraft tire with a diameter 15 inches and a tire width 193 mm equipped with an antenna with an antenna width of 50 mm, the L/W is 0.259067, and the communication distance is 32 cm.

FIG. 9 depicts a graph in which the values described above are plotted with the vertical axis representing the communication distance (cm) and the horizontal axis representing the value L/W.

As can be seen from FIG. 9, the aircraft tire T with diameter 21 inches according to the present embodiment is superior to the aircraft tire according to the comparative example (15 inch) in terms of the communication distance.

It can also be seen that in the aircraft tire T (21 inches) according to the present embodiment, the value L/W converges to a range of 0.1 to 0.2.

Accordingly, in the case where the diameter of the aircraft tire is 21 inches or more, and where the width size of the aircraft tire is denoted as "W" and the sum of the lengths of the antennas in the extending direction is denoted as "L", a relationship $0.1<L/W<0.2$ is satisfied.

Action/Effect

According to the above-described embodiment, the following effects are obtained.

That is, the aircraft tire T according to the present embodiment includes an RFID tag 10 having an IC chip 11 configured to store information about the aircraft tire and antennas A1 and A2 extended from the IC chip 11; wherein, in a tread surface view, the antennas A1 and A2 are disposed such that the extending direction D1 of the antennas A1 and A2 are parallel to the tire width direction or intersects the tire width direction D2 within the predetermined angle range, and when the relationship 0.1<L/W<0.2 is satisfied, where the width dimension of the aircraft tire is denoted as "W" and the total length of the antenna in the extending direction is denoted as "L", and when the diameter of the aircraft tire T is 21 inches or more, the communication performance improves.

When the value L/W is smaller than 0.1, the total antenna length (L) (antenna width) is short with respect to the tire width (W), so that the antenna characteristics may deteriorate.

If L/W is greater than 0.2, the total antenna length (L) (antenna width) is long with respect to the tire width (W), resulting in a disadvantage that workability and mountability at the time of mounting the antenna may deteriorate.

Since the antenna can be configured of a monopole antenna or a dipole antenna exhibiting a linear shape or wavy line shape, various types of RFID tags can be employed.

Since the RFID tag 10 can be attached to the tire inner surface 102, it can be brought close to the bead section 100, and communication property may be further improved by functioning the bead section 100 as an antenna. Further, the sensitivity of the RFID tag 10 can be enhanced by the reflection of the electromagnetic wave by the bead section 100.

Since the RFID tag 10 may be disposed to be circumferentially apart from the balance patch provided on the tire inner surface, the RFID tag 10 may be provided in a state where the balance of the aircraft tire T is maintained.

Further, since the belt part 103 disposed in the tread section 106 is made of a non-metal material, the attenuation of electromagnetic waves or the like between the RFID tag 10 and the RFID reader/writer 200 may be reduced and the communication performance may be improved.

Although the aircraft tire T of the present invention has been described above based on the illustrated embodiment, the present invention is not limited thereto, and the configuration of each part can be replaced with any configuration having a similar function.

REFERENCE SIGNS LIST

T AIRCRAFT TIRE
A1, A2, A3, A4a, A4b ANTENNA
D1 EXTENSION DIRECTION
D2 TIRE WIDTH DIRECTION
10 RFID TAG
11 TAG MAIN BODY (IC CHIP)
100 BEAD SECTION
102 TIRE INNER SURFACE
104 SIDEWALL SECTION
106 TREAD SECTION

The invention claimed is:

1. An aircraft tire having a pair of bead sections, sidewall sections extending from outer side in a radial direction of the bead sections, and a tread section extending between the sidewall sections, the aircraft tire comprising:
   an RFID tag comprising: a tag main body configured to store information about the aircraft tire, and an antenna extended from the tag main body, wherein
   a diameter of the aircraft tire is 21 inches or more,
   the tag main body and the antenna of the RFID tag is sealed within a rubber patch and the rubber patch is attached to the tire inner surface of the tread section by an adhesive,
   the antenna is a monopole antenna or a dipole antenna,
   the antenna is disposed such that an extending direction of the antenna is parallel to a tire width direction or intersects the tire width direction within 5 degrees in a tread view, and
   the aircraft tire satisfies a configuration 0.1<L/W<0.2, where a width of the aircraft tire is denoted as "W" and a total length of the antenna in the extending direction of the antenna is denoted as "L", and when a diameter of the aircraft tire is 21 inches or more.

2. The aircraft tire according to claim 1, wherein the monopole antenna or the dipole antenna has a linear shape or wavy line shape.

3. The aircraft tire according to claim 1, wherein the RFID tag is disposed circumferentially apart form a balance patch provided on the tire inner surface.

4. The aircraft tire according to claim 1, wherein a belt part disposed in the tread section is made of a non-metal material.

* * * * *